April 3, 1934.  F. C. MILLER ET AL  1,953,537
AIR WASHING SYSTEM
Filed Aug. 19, 1931
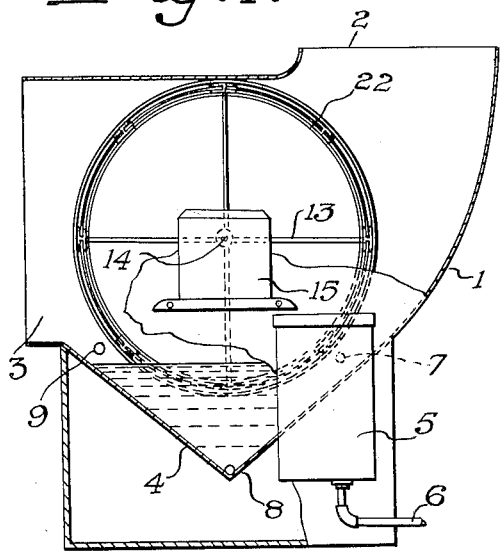
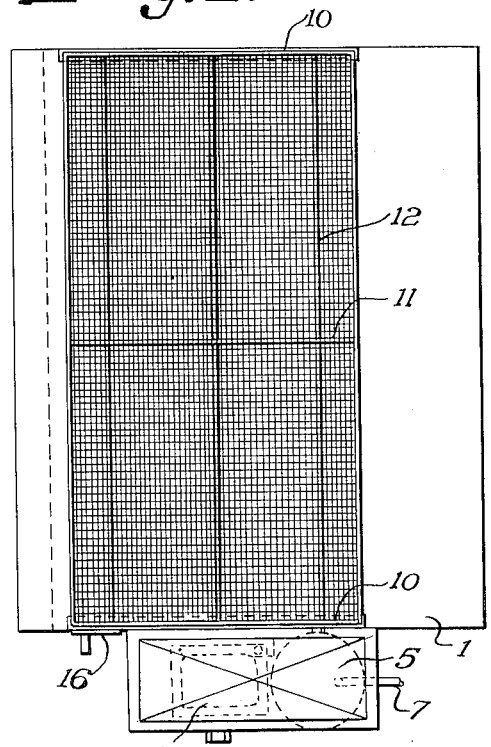
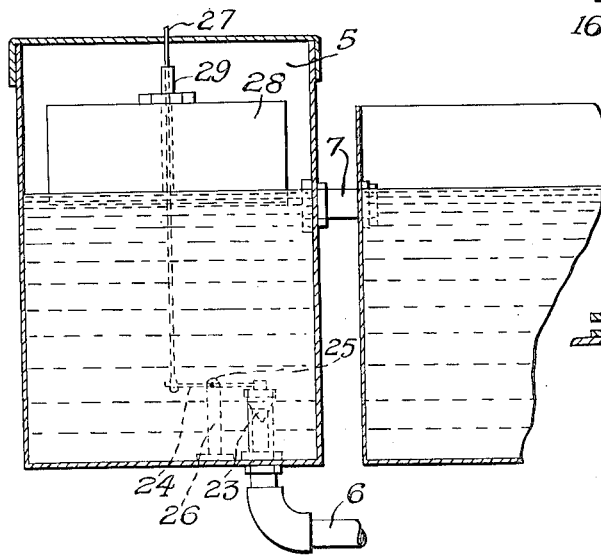
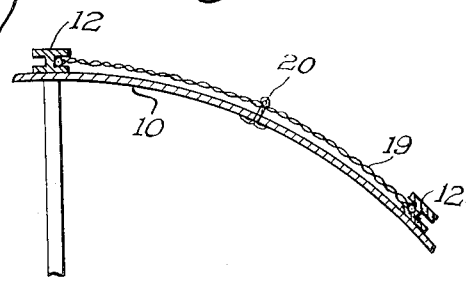
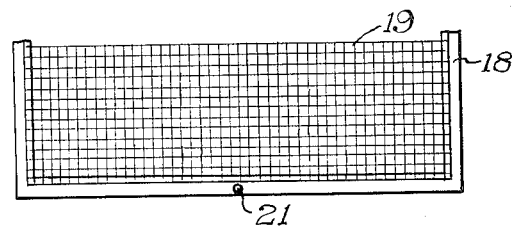
INVENTORS
Franklin C. Miller and
John N. Wagener
BY William B. Jasper
ATTORNEY Patented Apr. 3, 1934

1,953,537

UNITED STATES PATENT OFFICE 1,953,537

AIR WASHING SYSTEM

Franklin C. Miller and John H. Wagener, Pittsburgh, Pa.

Application August 19, 1931, Serial No. 558,064

1 Claim. (Cl. 261—92)

This invention relates to air filtering systems and it is among the objects thereof to provide a combined air filter and filter washing apparatus for use in conditioning air for heating plants, or for general ventilating purposes.

A further object of the invention is the provision of apparatus which shall be adapted to be connected to the air intake of heating systems or the like without interferring with the normal operation of said systems to which it may be connected; which shall be of simple compact and durable mechanical construction; and which shall be efficient in its operation to filter air in large volumes and at high rates of flow.

A further object of the invention is the provision of a filter screen of cylindrical form which is disposed in the path of the air flowing through the filter in a manner to constitute a complete baffle which requires the passing of all of the air through the filter.

A further provision of the invention is the utilization of a washing medium in the filter per se whereby the filter screen is continually washed and moistened thereby providing for the accumulation of solid particles and lint on the surface of the filtering screen, and other objects of the invention are the provision of means for regulating the speed of travel of the filter through the wash water, means for controlling and maintaining a predetermined level of wash water in the filter housing, and means for removably mounting the filtering screens on the cylinder to render them readily removable for renewals or repairs.

These and other objects will become more apparent from a consideration of the accompanying drawing constituting a part hereof in which like reference characters designate like parts and in which:

Figure 1 is a vertical cross-sectional view of an air filtering apparatus embodying the principles of this invention;

Figure 2 a top plan view thereof;

Figure 3 a cross-section of the water level control tank and a portion of the filter water tank or washer;

Figure 4 a top plan view of a detailed portion of the filtering screen; and

Figure 5 a cross-sectional view of a portion of the cylindrical supporting frame on which the filtering screens are mounted.

With reference to the several figures of the drawing, the structure therein illustrated comprises a filtering housing generally designated at 1 formed of sheet metal or any other suitable material having an air inlet opening 2 at the top thereof and an air discharge opening 3 at one side thereof.

The bottom of the housing 1 is of substantially V-shape as shown at 4 to constitute a reservoir for water which is supplied through the control tank 5 from a water supply line 6 from which it is directed through a connecting passage 7 to the filter washer which constitutes the lower portion of the filter housing 1.

A drain pipe 8 is provided in the bottom of the housing, and an overflow pipe 9 maintains a predetermined water level which is supplied through the pipe 6 and the control tank 5.

The filtering elements consist of a frame structure comprising end rings or bands 10, a central ring 11 and horizontal braces 12 connected to the end bands and the center band, said braces being of substantially H-shape as shown in Figures 1 and 5 of the drawing. The rings are provided with spokes 13 which cross at the axis of the cylinder at which point they are connected to a shaft 14 which is journalled at its end and operated through a gear reduction mechanism and variable speed motor all of which constitute the drive mechanism 15.

A door 16 is provided near the exit end of the filter housing 1 to provide access to the interior of the housing for the removal and renewal of the filter screens or for other purposes.

The filter consists of screen members in the shape of a rectangular frame element 18 having wire screen 19 mounted thereon to which the filtering cloth or paper is attached.

The screen is adapted to be disposed between adjacent H bars or braces 12 by sliding the frame portion 18 into the slots of the H member as shown in Figure 5 of the drawing.

The filter screens are secured in the horizontal braces by means of a cotter pin 20 passing through the perforation 21 in the ends of the frame 18 and through the end rings 10 or the screens can be held against movement by any other suitable means.

The end rings 10 of the filter structure are provided with wide flanges or guards 22 to prevent the escape of air passing through the filter housing along the ends of the filter structure.

Since there will be loss of liquid from the bottom of the filter housing due to evaporation and particularly on account of the contact of the filtering screen therewith during its rotation on the cylindrical frame, provision is made to maintain a suitable and adequate water supply in the filter housing.

To this end the control tank 5 is provided, having a valve 23 which controls the flow of water supply through the pipe 6, the valve 23 being operated through a lever 24 which is pivoted at 25 to an upright or post 26.

One end of the lever 24 is connected to a rod 27 standing vertically upward in the tank, said rod being provided with a large float 28 that is secured thereto by fastening means 29, the object of the float being to open the valve 23 when the water recedes in the filter tank.

The operation of the apparatus is briefly as follows: The filter housing 1 is connected at the air discharge side 3 to the air intake of a heating system or the like which is provided with a suction means such as a suction fan or the like which causes air to be drawn into the housing through the opening 2. The cylindrical filtering apparatus is set in motion by means of the drive mechanism 15 which is regulated to the proper speed to rotate in a counter-clockwise direction as viewed in Figure 1 of the drawing.

The filter cloth on the screens 19 passes through the water contained in the bottom portion of the housing and is in a moist condition as it traverses the space below the air intake opening 2 and on the side of the discharge opening 3. In this moist condition, any lint or solid particles entrained in the air drawn through the housing is deposited against the filter screen, and since the air must pass through the filter cylinder and emerge through the opposite wall from which it enters, it is subjected to a double filtering action as it passes from the intake 2 to the discharge 3 of the housing.

The speed of the cylinder is preferably regulated so that the filtering screens will pass through the water as frequently as possible without, however, causing any visible displacement of the water in the housing or without causing a film of water to be drawn up which would have a tendency to clog the screen.

Due to the passage of the air through the moistened screens, considerable water will be absorbed and provision is made to constantly renew the supply to maintain a given level through the water control tank 5.

As the water in the housing recedes, the float 28 will lower by the action of gravity and by virtue of its connection with lever 24 to the valve 23, the latter will be opened allowing water supply from the pipe 6 to enter the control tank and from the tank 5 through the connected piping 7 to the bottom of the filter housing. When the level is reached where the float will rise to the position as shown in Figure 3 of the drawing, the valve 23 will be closed thereby shutting off the water supply.

The construction of the float and valve and the supplemental supply tank is such that the action for supplying water is positive and reliable, and the apparatus is of such simple construction and function that it is readily responsive to changes in the level of the water to render it operative for the purpose of maintaining the normal level.

By virtue of the filtering screen construction, it is a simple matter to completely renew the entire filter by sliding the screen out of the horizontal braces 12 and replacing them with new ones. When the filter housing requires cleaning, the water is drained out through the drain pipe 8 and after the housing is cleaned its level will be automatically restored through the control tank 5.

It is evident from the foregoing description of the invention, that filtering systems as herein described, provide simple and efficient means for maintaining an adequate supply of washed air for various purposes and particularly where there is an available suction means through which the air may be drawn into the filter as described. It is also evident that on account of the rotating character of the filtering means through which the amount of moisture on the screens can be regulated, it is possible to control the humidity of the washed air passing through the system.

Although one embodiment of the invention has been herein illustrated and described it will be obvious to those skilled in the art that various modifications may be made in the details of construction without departing from the principles herein set forth.

We claim:

In a filtering system the combination with a housing having inlet and outlet openings for the passage of air therethrough, a water reservoir at the bottom of said housing, a cylindrical screen structure disposed in said housing, said cylinder comprising a cage structure having rectangular screen members which are slidably mounted therein.

FRANKLIN C. MILLER.
JOHN H. WAGENER.